INVENTORS.
HOWARD C. BAUER
ROBERT G. BELL &
ROBERT D. MITCHELL
BY
*Fay & Fay*
ATTORNEYS

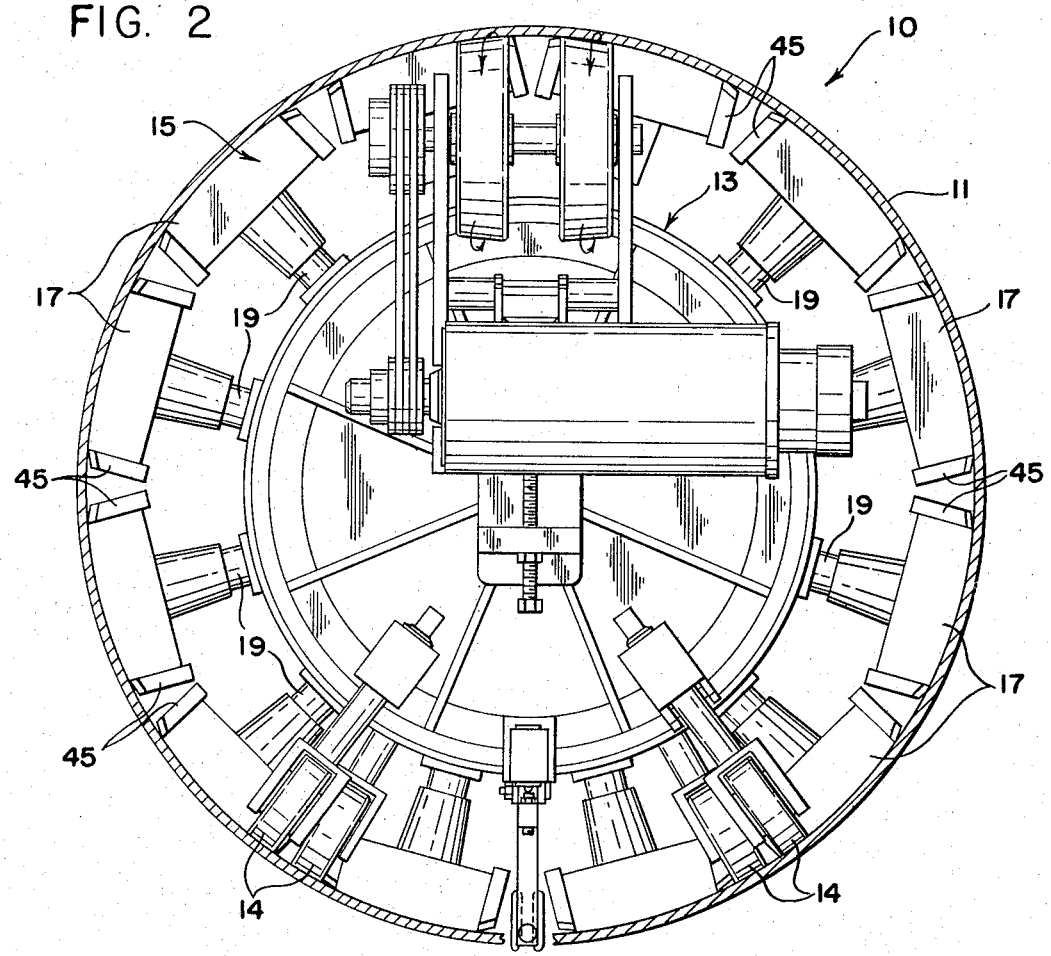
FIG. 2
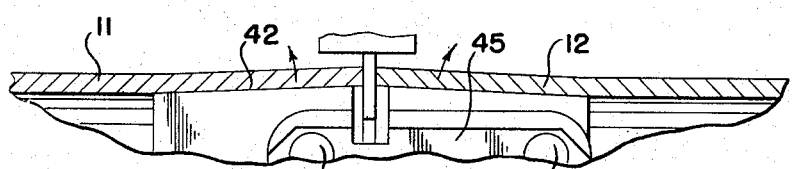
FIG. 6
FIG. 7
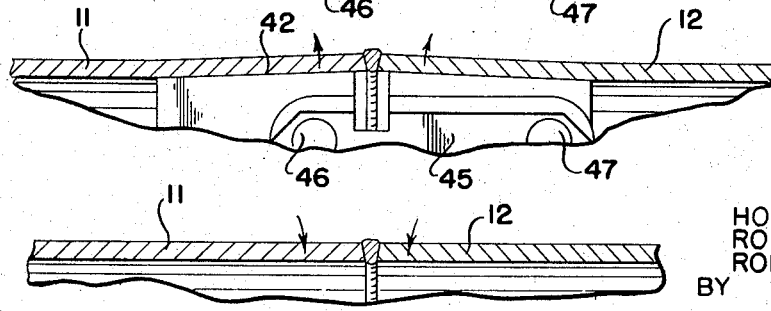
FIG. 8

INVENTORS.
HOWARD C. BAUER
ROBERT G. BELL &
ROBERT D. MITCHELL
BY
*Fay & Fay*
ATTORNEYS

Jan. 9, 1968 H. C. BAUER ETAL 3,362,603
INTERNAL ALIGNMENT CLAMP
Filed Sept. 14, 1964 4 Sheets-Sheet 4

INVENTORS.
HOWARD C. BAUER
ROBERT G. BELL &
ROBERT D. MITCHELL
BY
*Fay & Fay*
ATTORNEYS

United States Patent Office 3,362,603
Patented Jan. 9, 1968

3,362,603
INTERNAL ALIGNMENT CLAMP
Howard C. Bauer, Bedford, Ohio, Robert G. Bell, Calgary, Alberta, Canada, and Robert D. Mitchell, Solon, Ohio, assignors to Bauer & Associates, Inc., Solon, Ohio, a corporation of Delaware
Filed Sept. 14, 1964, Ser. No. 396,313
6 Claims. (Cl. 228—5)

ABSTRACT OF THE DISCLOSURE

A clamping assembly having a frame adapted to move through the interior of cylindrical pipe sections. A first and second set of clamping shoes are movably carried by the frame and are adapted to independently, clampingly engage the inner peripheral wall of a cylindrical pipe. Cam assemblies are operably connected to each set of clamping shoes to move them into engagement with the peripheral wall of the cylindrical pipe.

---

This invention relates to a clamp adapted to be used during a welding operation and more particularly to a clamp for holding elongated pipe sections in end-to-end relationship during the welding thereof.

The primary object of this invention is to provide an internal clamping device which is adapted to hold two sections of pipe in end-to-end relation, with the clamp providing sufficient force to bring the inside periphery of each adjacent end section of the pipes to a substantially circular configuration and to stretch the wall of the pipe to a point slightly below the yield point.

Another object of the invention is to provide a clamping device which is capable of exerting a maximum clamping force throughout the range of maximum and minimum inside diameters allowable for any specified pipe size.

A further object of the invention is to provide an internal aligning clamp adapted to clamp adjacent ends of two pipes with means interconnecting the clamping shoes thereby maintaining the relationship of the pipe ends despite the presence of external forces acting on the pipes.

Still a further object of the invention is to provide an internal alignment clamp which utilizes specially designed removable shoes adapted to accommodate different sizes of pipes.

The above objects, as well as others which will become more apparent upon a complete reading of the specification, are accomplished by an internal alignment clamp comprising two clamping sections, each section operating one set of expanding clamping shoes. These clamping shoes are adapted to contact the internal periphery of a section of pipe, with each set of shoes being independently operable thereby permitting the positioning and clamping of one pipe section prior to the positioning and clamping of another pipe section. The clamping force for each set of clamping shoes is supplied by an air operated piston which actuates an axially movable cam assembly consisting of a cam hub and cam blocks. The cam blocks act on force arms which are connected to push rods mounting the clamping shoes. As the force arms are displaced radially outwardly, a corresponding radial movement is imparted to the push rods and shoes until the shoes are in clamping engagement with the wall of the pipe.

The cam contour on the face of the cam blocks includes a fast rise portion which is operable during the initial movement of the cam assembly and a slow rise portion which is operable during the application of the force to effect clamping of the shoes.

The sets of clamping shoes are released by exhausting the air operated piston and introducing air pressure acting in an opposite direction thereby retracting the cam assembly and permitting the return of the force arms, push rods and shoes under the bias of appropriate springs.

An additional feature is the provision of a link interconnecting the shoes of one set with the shoes of the other set. Thus, each shoe has a link pivotally connected at one end to it and the other end of the link is pivotally connected to the corresponding shoe in the other set of clamping shoes. The purpose of the links is to maintain the spaced relation of the shoes when in the clamped position and thereby maintain the relationship between the adjacent ends of the pipe sections.

Still another feature is the incorporation of specially designed shoes which include an angular contacting surface so that the radial deformation of the pipe wall is greatest at the end point and decreases axially inwardly of the pipe. In addition, the shoes are removably carried by the push rods so that different configurations and sizes of shoes may be readily utilized to accommodate different sizes and configurations of pipes.

A further feature of the invention is the provision of a novel method to effect the welding of the pipe sections in an end-to-end relationship by deforming the ends of the pipes to a substantially circular configuration and at a point below the yield point of the material, welding the ends of the pipes circumferentially and releasing the clamps.

To the accomplishment of the foregoing and related ends, the following description sets forth in detail one approved means of carrying out the invention. Such disclosed means is not meant to be limiting inasmuch as it constitutes but one of the various ways in which the principles of the invention may be applied.

In the drawings wherein like reference numerals indicate like parts in the various views:

FIG. 2 is an end elevation view taken along line 2—2 of FIG. 1;

FIGS. 6, 7 and 8 depict schematically some of the steps involved in securing the pipes in end-to-end relation.

Figure 1:
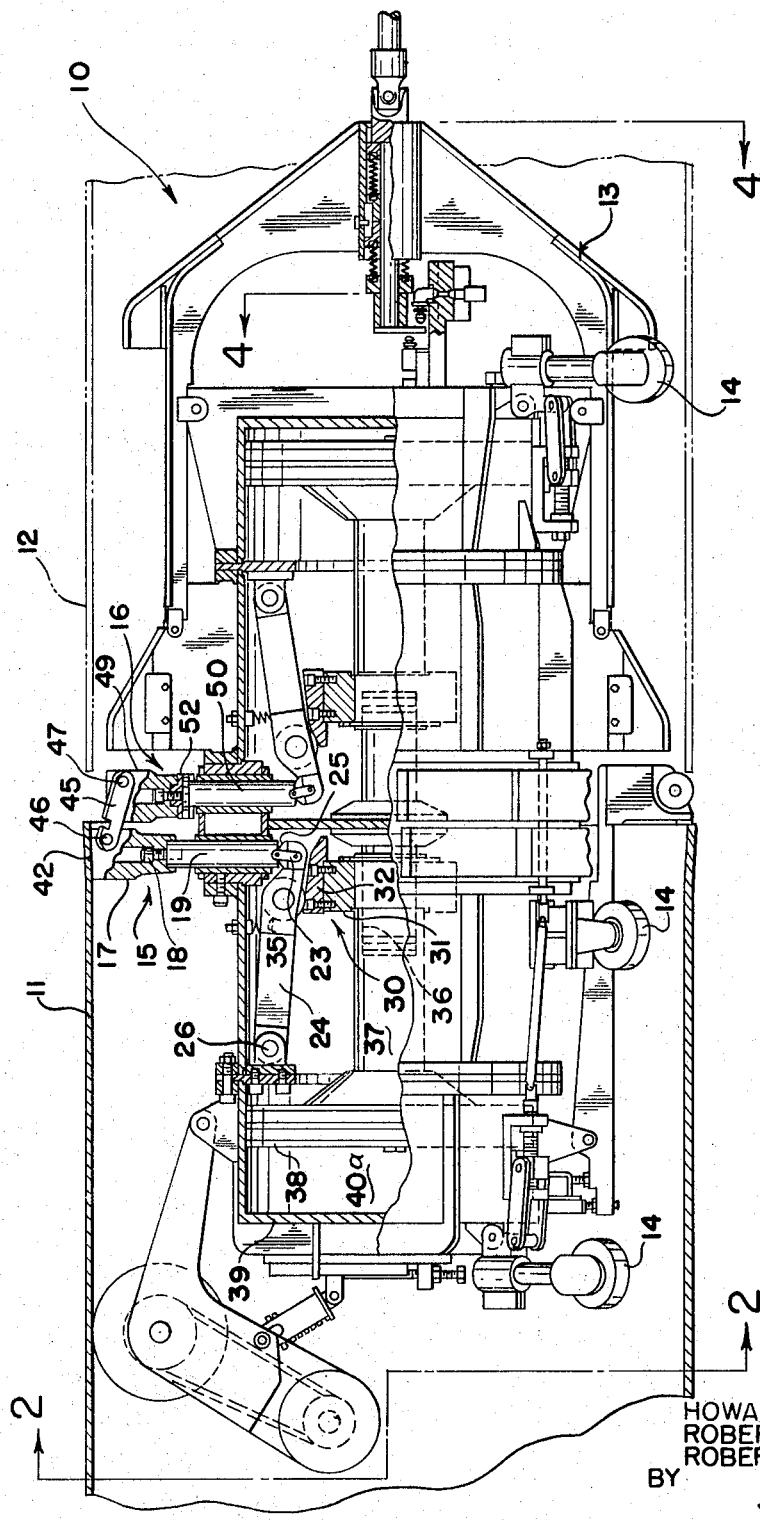
FIG. 1 is a side elevation view in section showing the clamp assembly in the pipe sections, with one section clamped in position.

Referring to FIG. 1, there is illustrated the clamp assembly indicated generally by the reference numeral 10. The clamp assembly 10 is adapted to be received in cylindrical pipe sections such as indicated by 11 and 12, with the pipe sections being adapted to be welded in end-to-end relationship. The function of the clamp assembly 10 is to grip the adjacent ends of the pipes 11, 12 and maintain the pipes in end-to-end relationship during the welding operation.

The clamp assembly 10 comprises a vehicular unit including a frame 13 on which there is mounted a plurality of rollers 14. The rollers are adapted to render the unit mobile for passage through the pipe sections. An appropriate driving mechanism is supported by the frame along with actuating means for controlling the movements of the assembly.

The frame 13 further includes two sets of clamping shoes which are indicated generally by the reference numerals 15, 16. Each of the clamping shoe assemblies is substantially identical to the other so that, for purposes of disclosure, only the details of the clamping shoe assembly 15 will be discussed.

The clamping shoe assembly 15 comprises a shoe 17 which is attached by means of a bolt 18 to one end of a push rod 19. As shown more clearly in FIG. 2, a plurality of identical shoes 17 are spaced around the entire circumference of the pipe section 11 so that an even distribution of the clamping force is obtained. The push rod 19 is received in a guide 20 carried by the frame 13. In addition, each of the shoes 17 is slidably received between guiding surfaces 21, 22 carried by the frame as shown in FIG. 2.

Connected to the radially inner end of the push rod 19 is a link 23 which is also connected to a force arm 24. The force arm includes a contoured surface 25 which engages the inner end of the push rod 19 with the link 23 serving to maintain this abutting relationship. The force arm 24 is connected by a pivot 26 to the frame 13 so that the force arm 24 may pivot relative to the frame. An appropriate biasing means such as springs 27 are associated with each force arm-push rod combination so that each shoe 17 is normally biased radially inwardly away from engagement with the wall of the pipe section.

To engage the shoe 17 with the pipe wall, there is provided a cam assembly, indicated generally by the reference numeral 30. This cam assembly includes a hub 31 on which there is secured a plurality of cam blocks 32. Each cam block includes a contour face of two configurations, the first being a relatively steep sloping face 33 followed by a slow rise portion 34. Adapted to engage the face contour of the cam block is a roller 35 carried by the force arm 24 intermediate its ends. The cam assembly 30 is adapted to be displaced longitudinally of the clamp assembly so that engagement of the roller 35 on the face contour of the cam block 32 effects a pivoting radial displacement of the force arm which in turn radially displaces the clamping shoes. The longitudinal movement of the cam assembly is supported by a guiding portion 36 secured to the frame 13.

Figure 3:
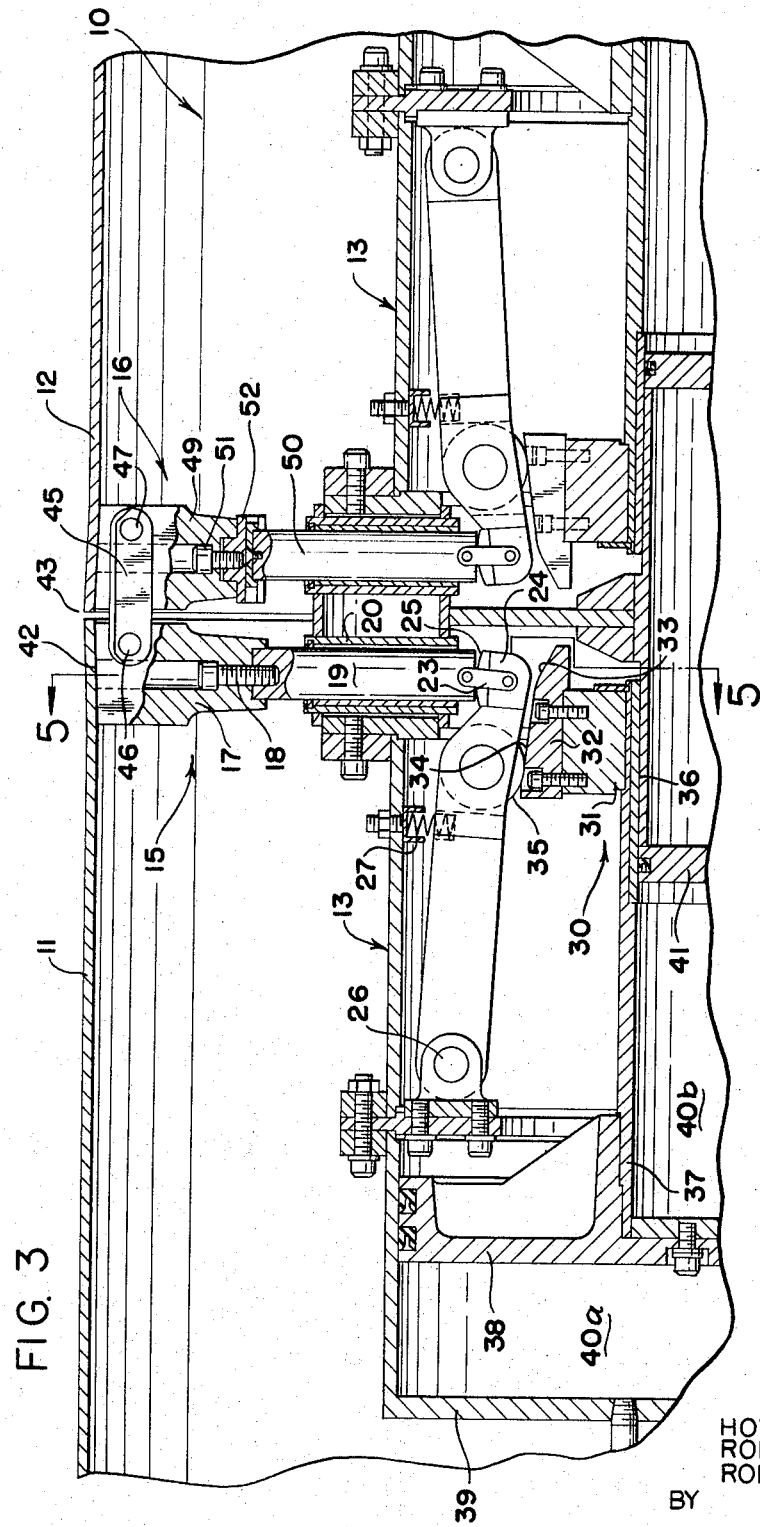
FIG. 3 is a partial section similar to FIG. 1 showing both pipes clamped by the assembly.
Figure 4:
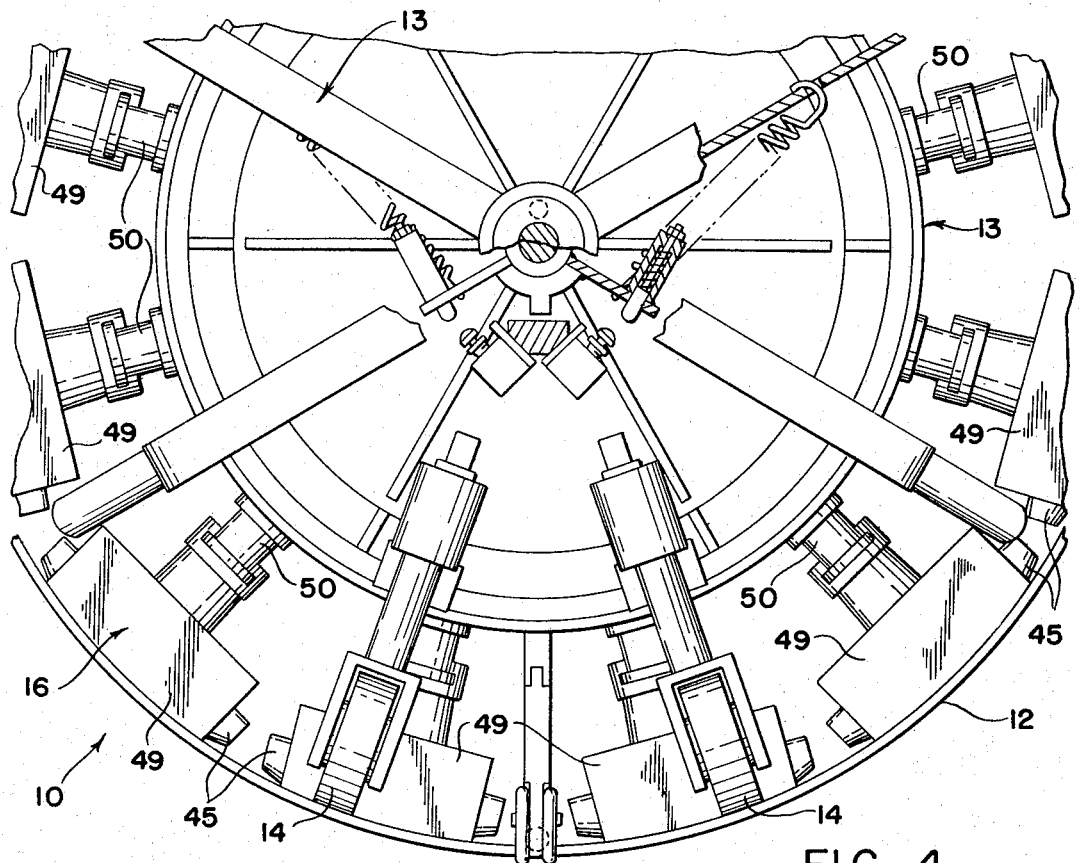
FIG. 4 is a view taken along line 4—4 of FIG. 1.
Figure 5:
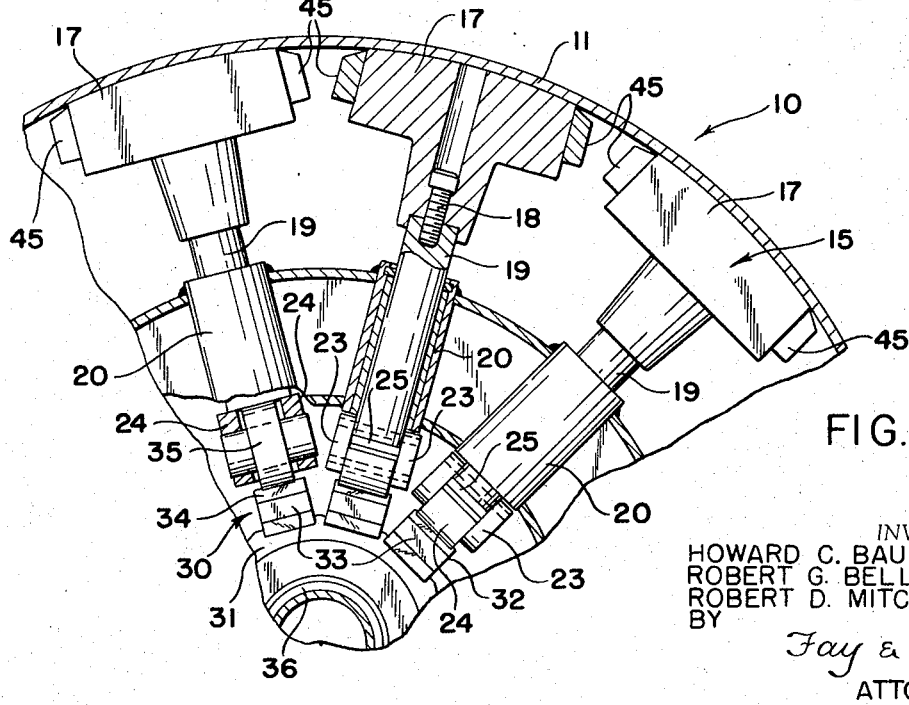
FIG. 5 is a view taken along line 5—5 of FIG. 3.

The assembly 30 includes a tubular extension 37 to which there is secured a piston 38. The piston 38 cooperates with a wall portion 39 on the frame to define a first fluid chamber 40a. Similarly, the extension 37 cooperates with wall portion 41 of the guiding frame 36 to describe a second fluid chamber 40b. It is believed to be apparent that with air pressure in the chamber 40a acting against the face of the piston 38, a longitudinal movement of the cam assembly will be effected. Upon exhaustion of the air from the chamber 40a and introduction of pressure in chamber 40b, retraction of the cam assembly to its initial position will be effected. The precise means for supplying the air pressure to the chambers has not been described inasmuch as it does not comprise any part of the present invention. The operation of the device above described is as follows: The vehicular unit is moved along a pipe section until the clamping shoe assembly is in position adjacent the end of the first pipe section 11. In this position, air pressure is introduced into the chamber 40a causing the cam assembly 30 to be displaced to the right as viewed in FIGS. 1 and 3. As the cam assembly is displaced, the roller 35 first engages the contoured surface 33 on cam block 32. The steep contour 33 effects a relatively fast rise of the force arm and the push rod during the first portion of the cam travel thus bringing the shoe 17 rapidly into proximity of the pipe wall. As the cam assembly 30 continues its longitudinal travel under the air pressure and as the shoe 17 commences to exert a clamping force against the pipe wall, the roller 35 engages the slow rise portion 34 of the cam for applying the maximum force against the pipe wall. The pressure in the chamber 40a and the spacing of the shoes are such that the pipe wall is deformed uniformly around its periphery to a substantially true circular configuration. The pipe wall is stressed and deformed by the shoes 17 to a point just below the yield point of the material. In addition, as shown in FIG. 3, the configuration of the contacting face of the shoe 17 is such that a greater deformation of the pipe wall occurs at the terminal portion of the pipe and tapers radially inwardly axially of the pipe. This is shown in exaggerated detail in FIG. 3 wherein the tapering face configuration of the shoes is clearly visible at 42.

It is important to note that the deformation of the pipe wall is accomplished by providing sufficient travel of the cam assembly to compensate for any deviations in the inside diameter of the pipe. Thus, if a pipe section has a minimum inside diameter allowable for the specific pipe size, less longitudinal travel of the cam assembly will be required to cause engagement of the shoes with the pipe wall. On the other hand, assuming a pipe section having a maximum inside diameter of the pipe for the specified pipe size, additional cam travel is required, and provided, to displace the clamping shoes a greater distance radially thereby to compensate for the variation in the inside diameter of the pipe. This is to be contrasted with the prior art wherein tolerance variations in the diameter of the pipe sections prevented the application of a uniform force on the pipe wall.

By providing a tapered configuration on the face 42 of the clamping shoes, a circular peak is formed at the juncture of the two pipe sections as shown at 43. This circular peak provides compensation for the weld material as it cools and contracts after the welding operation.

Assuming the pipe 11 is in a clamped position as shown in FIG. 1, a second pipe section is moved into position adjacent the end of the pipe section 11. The new pipe section 12 is guided in its positioning movements by external mechanism known to those having ordinary skill in the art and is spaced from the end of pipe section 11 by appropriate spacing mechanism as shown schematically in FIG. 7. Once the pipe section 12 is in position, the second set of clamping shoes 16 are actuated in a manner similar to that described in connection with the clamping shoes 15 so that the two pipe sections 11, 12 are restrained by the frictional grip of the internal clamps.

To assure the continued alignment and spaced relationship of the pipe sections 11, 12, there is included a link 45 which is pivotally connected at 46, 47 to shoes 15, 16 respectively. It is contemplated that each set of shoes would include a link similar to link 45 and appropriate slots are provided in the shoes to compensate for the pivoting of the link 45 during relative motion between the shoes, such as that shown in FIG. 1. The link 45 serves to maintain the sets of shoes 15, 16 in a spaced relation so that with the pipe ends clamped as shown in FIG. 3, there is no possibility of the pipe sections being displaced relative to each other. Moreover, by using a link 45 between each pair of shoes, any external forces acting on the shoes is not transmitted to the push rods, guides or frame assembly.

Assuming the pipe sections 11 and 12 to be spaced and clamped as shown in FIG. 3, a weld is laid at the peak 43 as shown in FIG. 8 thereby securing the two pipe sections in end-to-end relationship. With the weld completed, the shoe assemblies 15, 16 are retracted by introducing air into the chamber 40b thus returning the cam assembly 30 to its original position and permitting the biasing means 27 to retract each shoe radially away from contact with the pipe wall. With the shoes retracted, the vehicular unit may be advanced through the pipe section to the next joint to be completed.

As additional compensation for rendering the assembly adaptable to different sizes of pipes, the shoes are removably carried by the shoe assemblies. Thus, shoe 17 may be removed from its push rod by removing bolt 18. In this manner, shoes of varying thicknesses and heights may be inserted to accommodate smaller or larger pipes than those shown in FIG. 3. The shoe 49 in the shoe assembly 16 is mounted on its push rod 50 in a somewhat different manner. Thus, a bolt 51 secures the shoe 49 removably to a mounting bracket 52. The bracket 52 in turn is adjustably mounted by a slotted guide arrangement to the outer end of the push rod 50. This arrangement permits lateral adjustment of the shoes in the sets 15, 16 relative to each other.

Additional modifications and changes will suggest themselves to those having ordinary skill in the art. Changes such as these are contemplated by the principles of the invention so that although for ease of description, the principles of the invention have been set forth in connection with but one illustrated embodiment, it is not intended that this illustrated embodiment or the terminology employed in describing it is to be limiting, but rather, it is our desire to be restricted only by the scope of the appended claims.

We claim:
1. A clamping assembly comprising:
    a frame;
    means on said frame adapted to support said frame for movement through the interior of cylindrical pipe sections;
    first and second sets of independently operable clamping shoes movably carried by said frame and being adapted to clampingly engage the inner peripheral wall of a cylindrical pipe;
    means on said frame operatively connected to said sets of clamping shoes operable to engage said sets of shoes with the pipe wall; and
    links supported by and interconnecting said sets of shoes to permit the relative radial movement and to assure the rigid spaced relationship of said shoes when said shoes are in clamping engagement with the pipe wall.
2. The clamping assembly of claim 1 wherein said means operable to engage said sets of shoes with the pipe wall includes means for operating each set of shoes independently of the other.
3. The combination of claim 2 wherein said latter-mentioned means includes an independently operable cam assembly associated with each set of said clamping shoes; said cam assembly being movable longitudinally of said frame and operatively connected to said set of clamping shoes to effect radial movement of said shoes.
4. An internal alignment clamp assembly comprising:
    a rigid frame having means thereon to support said frame for movement through the interiors of cylindrical pipe sections;
    said frame having spaced apart independently operable first and second sets of clamping shoes movably carried thereby and being adapted to engage the inner peripheral wall of a cylindrical pipe;
    force applying means operatively connected to said sets of clamping shoes and being adapted to independently move said first and second sets of clamping shoes from a contracted position spaced from the pipe wall to an expanded position in clamping engagement with the pipe wall; and
    each of said clamping shoes having a tapered clamping face thereon, said clamping faces tapered to face outwardly from the space between said first and second set of clamping shoes.
5. An internal pipe clamp adapted to secure adjoining ends of elongated pipe sections in spaced apart relationship comprising:
    a frame;
    a plurality of spaced independently operable sets of radially extensible clamping shoe assemblies carried by said frame;
    said clamping shoe assemblies each comprising a plurality of shoes adapted to engage the inner peripheral wall of the pipes;
    sets of independently operable radially movable push rods guidedly supported by said frame and secured to each shoe at one end thereof;
    said push rods being movable radially to a position wherein said shoes engage the pipe wall;
    a plurality of force arms pivotally connected at one end to said frame;
    the other end of each of said force arms being operatively connected to the other end of one of said push rods;
    independently operable cam assemblies movably carried by said frame for longitudinal movement relative to said frame;
    said cam assemblies including contoured cam faces adapted to engage said force arms and impart pivoting motion to said arm as said cam assemblies are displaced longitudinally.
6. The clamp of claim 5 wherein said cam assembly comprises a fast rise portion and a slow rise portion.

References Cited
UNITED STATES PATENTS

| | | | |
|---|---|---|---|
| 2,429,053 | 10/1947 | Forbes | 269—48.1 |
| 2,906,226 | 9/1959 | Myrick et al. | 267—48.1 |
| 3,016,856 | 1/1962 | Cummings | 269—34 |
| 3,109,477 | 11/1963 | Avera et al. | 29—48.1 |
| 3,253,841 | 5/1966 | Ahmad | 29—523 |

JOHN F. CAMPBELL, *Primary Examiner.*

M. L. FAIGUS, *Assistant Examiner.*